United States Patent [19]

MacMillan

[11] 4,069,089
[45] Jan. 17, 1978

[54] MOLD FOR APPLYING PRE-CURED TREAD RUBBER TO A TIRE, PREFERABLY UTILIZING A RUBBER ENVELOPE

[76] Inventor: Kenneth T. MacMillan, 4992 Wesleyan Woods Drive, Macon, Ga. 31204

[21] Appl. No.: 714,280

[22] Filed: Aug. 13, 1976

[51] Int. Cl.² .................. B29H 5/04; B29H 17/36
[52] U.S. Cl. .................... 156/394; 156/96; 264/326; 425/17; 425/18
[58] Field of Search .............. 156/95, 96, 123, 129, 156/126, 127, 128, 394; 264/36, 315, 316, 326; 425/11, 14, 15, 17–28, 34, 35, 39, 44, 46, 47, 56

[56] References Cited

U.S. PATENT DOCUMENTS

| 2,014,010 | 9/1935 | Wheatley | 425/18 |
|---|---|---|---|
| 2,185,542 | 1/1940 | Daniel | 425/20 |
| 2,228,212 | 1/1941 | Heintz | 425/17 |
| 2,480,578 | 8/1949 | Hodges | 425/17 |
| 2,746,515 | 5/1956 | Usack | 156/96 |
| 3,240,653 | 3/1966 | Mattox et al. | 156/96 |
| 3,526,930 | 9/1970 | Rawls | 425/34 |
| 3,614,969 | 10/1971 | Breiner | 425/17 |
| 3,886,028 | 5/1975 | Hindin et al. | 156/96 |
| 3,925,129 | 12/1975 | Blankenship | 156/96 |

OTHER PUBLICATIONS

The James C. Heintz Co. Brochure Article, "Matri-Chamber", Cleveland, Ohio.

Primary Examiner—William A. Powell
Assistant Examiner—John E. Kittle
Attorney, Agent, or Firm—Diller, Brown, Ramik & Wight

[57] ABSTRACT

This disclosure is directed to a mold particularly adapted for applying pre-cured tread rubber to a tire, the mold including a pair of generally annular mold bodies which collectively define a chamber adapted to receive a tire, the mold bodies being capable of relative axial adjustment whereby axial dimensions of the chamber may be varied to accomodate tires of different widths, an annular band for locking the mold bodies to each other at a particular position of axial relative adjustment, and axially shiftable means for maintaining the mold bodies at a desired position of relative axial adjustments.

Preferably an annular resilient rubber or like envelope surrounds the tire as well as its sidewalls to prevent steam or an equivalent heating medium from permeating between the tire and the pre-cured rubber glue thereto.

16 Claims, 3 Drawing Figures

U.S. Patent    Jan. 17, 1978    4,069,089
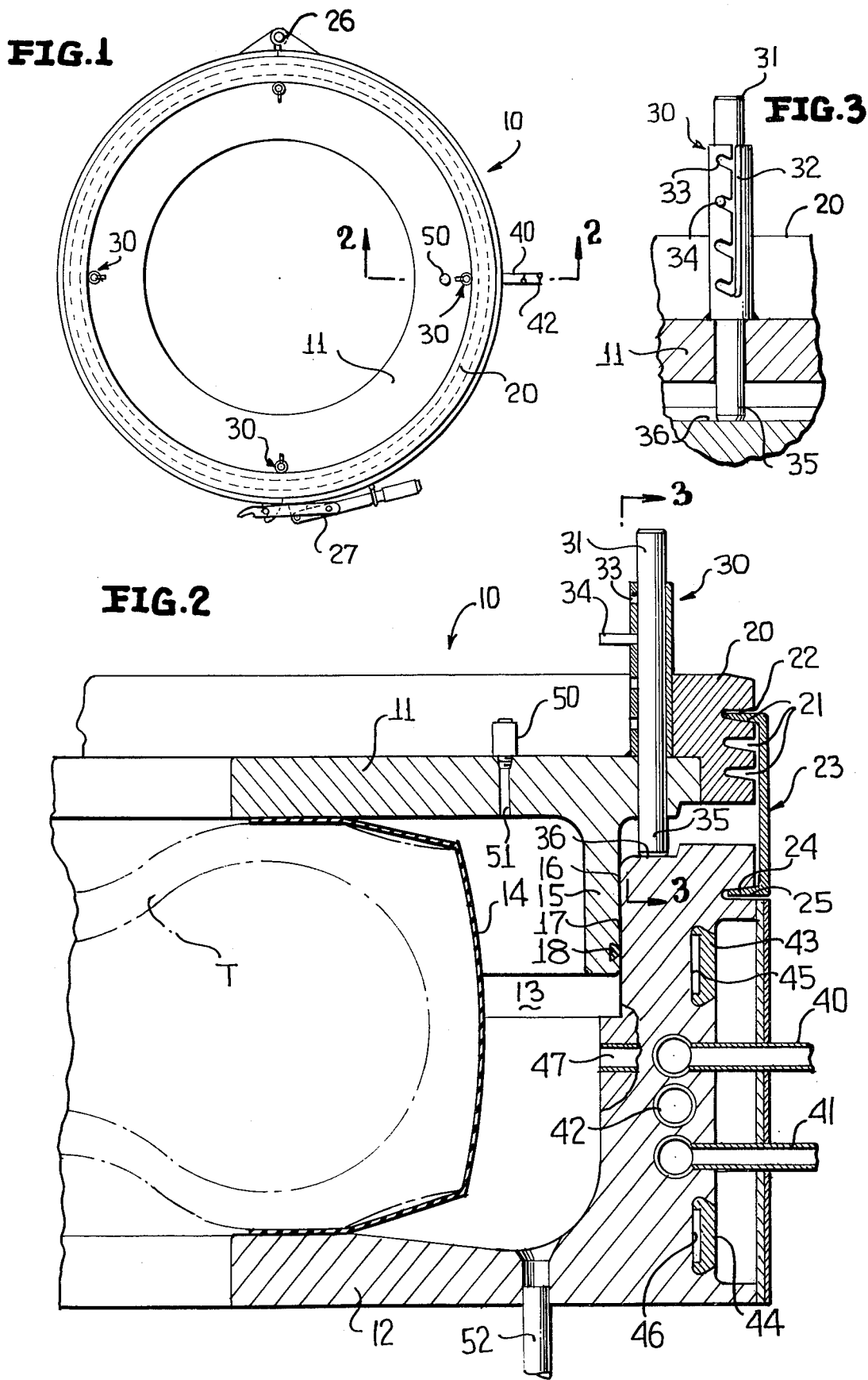

MOLD FOR APPLYING PRE-CURED TREAD RUBBER TO A TIRE, PREFERABLY UTILIZING A RUBBER ENVELOPE

Presently various types of molds are manufactured for applying pre-cured rubber to tires generally by first buffing the tire, cementing it, applying rapid cure cushion gum, and then applying the pre-cured tread stock. The crown and sidewalls of the thus treated tire are surrounded by an annular envelope which is designed to prevent steam or moisture from permeating into the area between the buffed surface of the tire and the new pre-cured tread. The tire with the pre-cured tread applied thereto and the envelope is then placed into what amounts to a watch-case type matrix or mold with the tread design removed. The two halves of this mold are held together by a standard locking band and these units are preferably made axially adjustable in order to accomodate different tire widths.

In keeping with the present invention a mold of the type just described is provided but improved by a plurality of grooves or lips for accomodating the locking band at any one of a number of different positions along with a plurality of axially shiftable and adjustable rods for maintaining the mold bodies at a desired position of relative axial adjustment. In this manner the mold chamber when the two annular mold bodies are closed at a maximum would accomodate a narrow tire, such as a 825×20. As wider tires are conditioned for curing the axially slidable rods are adjusted so that the annular mold bodies are shifted or spaced from each other axially thus increasing the chamber width to accomodate wider tires while at the same time the locking band will engage the proper lip or groove to maintain the mold closed under the increased internal pressure associated therewith.

If the customer for a mold of this type has a steam shop, steam boiler or the like the unit may be heated by steam with the latter being piped directly into the mold chamber to supply the heat and pressure directly upon the tread surface or to the tread surface through the latter-mentioned envelope.

In the case of an electric recapping or retreading establishment the mold is provided with flat heat elements cast into at least one of the mold members in dove tail or V-shaped grooves. Even in the case of a steam heated mold the steel tubing through which the steam and/or water is piped will be cast in situ during the pouring of the mold bodies in a foundry or the like. In the latter case an operator can fill the coil with water, heat the unit to a desired curing range of approximately 300°, and thereby in the process generate the steam required to fill the area between the tire (or the envelope associated therewith) and the mold bodies thereby supplying approximately 65 pounds of pressure to the tire as well as generating the heat necessary to cure the cushion gum thus joining the pre-cured tread stock to the crown of the tire. In effect the annular area between the mold bodies and the envelope or the tire crown functions as a flash boiler to achieve the necessary heat and/or pressure for curing purposes.

If found necessary or desirable the water introduced into the coil may or may not be circulated, although in either case appropriate control or regulating valves are provided to vent the steam from the coils to the mold chamber to keep the latter as full of steam as necessary for the curing operation but not so great as to exhaust the supply of steam before the curing operation is complete. At the end of a curing cycle the steam and/or hot water would, of course, flow by gravity (or augmentated by a pump) into a reservoir or tank for subsequent recycling. The tank may be provided with a suitable source of air under pressure to force the water or condensate back into the coil for repeated curing operations.

Preferably the upper mold body includes a valve which will permit air entrapped in the mold chamber to escape to atmosphere and the same valve may, of course, be used to purge the system of any air that may become entrapped therein.

IN THE DRAWING

FIG. 1 is a top plan view of a novel mold constructed in accordance with this invention, and illustrates a two-piece locking band for securing two mold bodies in a similar relationship as well as a plurality of actually shiftable means for maintaining the mold bodies at a predetermined position of relative axial adjustment.

FIG. 2 is a highly enlarged sectional view taken generally along line 2—2 of FIG. 1, and more clearly illustrates details of the mold bodies, the position of a tire therein, and an annular envelope defining with the mold bodies a curing chamber for the tire.

FIG. 3 is a fragmentary sectional view taken generally along line 3—3 of FIG. 2, and illustrates with more particularity the manner in which one of the plurality of axially shiftable means is constructed for relative shifting motion with respect to the mold.

A novel mold constructed in accordance with this invention is generally designated by the reference numeral 10 and includes a pair of generally annular mold bodies 11 and 12. The mold bodies 11 and 12 collectively define a generally annular chamber 13 in which is received a tire T having upon the crown thereof pre-cured tread (not shown) with the crown and sidewall being encased by an annular envelope or bladder 14 constructed from rubber or similar resilient material. The inner surface of the envelope 14 particularly in the area which contacts the tire sidewalls is provided with a plurality of grooves which extend generally from the tire crown radially inwardly toward the tire bead terminating at the inner-most ends of the envelope 14. The purpose of these grooves is to permit the venting of air or the like from the areas between and surrounded by the envelope 14 and the exterior surface of the tire crown, including the pre-cured tread thereon, and the tire sidewall. Thus when the chamber 13 is subjected to pressure the envelope 14 is urged into intimate pressure engagement with the pre-cured tread submitted to the crown as well as to the tire sidewalls thus assuring an intimate bonding of the pre-cured tread to the tire T in the absence of air, water, steam or like gaps between the exterior sidewall and pre-cured tread surfaces of the tire T and the envelope 14 surrounding the same.

The mold body 11 may be considered a lid or a closure which can be telescoped axially or pivotly (not shown) relative to the mold body 12 and to ensure accurate guidance the mold body 11 is provided with an annular flange 15 having an exterior surface 16 which corresponds to an interior annular surface 17 of the mold body 12. An annular or O-ring seal 18 carried by the flange 15 assures that the chamber 13 will remain hermetically sealed when steam, water, or the like is introduced there into during a curing operation.

The mold body 11 carries an annular element 20 which might be welded, bolted or otherwise secured thereto. The element 20 has a plurality of annular grooves 21 which selectively receive a flange 22 of a locking band 23 having another flange 24 which is at all times received in a groove 25 of the mold body 12. As is readily apparent from FIG. 2, the flange 22 seated in the highest groove 21 maintains the mold bodies 11, 12 axially spaced in the closest distance to each other but as the flange 22 is positioned in the next lower groove 21 and the last lowest groove 21 the axial distance between the mold bodies 11, 12 is increased thereby increasing the width of the chamber 13 to accomodate wider tires than the tire T illustrated therein. The locking band 23 is formed of two-halves pivoted together at 26 (FIG. 1) and having a conventional locking mechanism 27 diametrically opposite thereto. The function of the locking band 23 is, of course, simply that of maintaining the mold bodies 11, 12 secured to each other under the internal pressure within the chamber 13 during a curing operation. Though the locking band 23 also functions to maintain spacing between the mold bodies 11, 12, further means, generally designated by the reference numeral 30 are provided for this purpose.

The means 30 are a plurality of axially shiftable rods 31 circumferentially spaced about the mold body 11 and slidably received in a tube 31 having an axial slot 32 and a plurality of annular slots 33 (FIG. 3) which may selectively receive a detent 34 welded or otherwise fixed normal to each rod 31. By axially shifting each rod 31 relative to the mold body 11 a lower most end 35 thereof will bottom or rest against a shoulder 36 of the mold body 12 to thereby establish a spacial relationship axially between the mold bodies 11, 12 thus permitting the chamber 13 to be increased or decreased in dimension to accomodate narrower or wider tire widths.

The mold 10 is preferably coupled to a source of water by an inlet conduit 40, an outlet conduit 41, and a spiral coil 42 cast in situ within the mold body 12. As was noted earlier, the conduits 40, 41 are placed in food communication with a water reservoir or tank and appropriate valving is provided to either circulate water through the coil 42 or simply provide sufficient water therein without circulation such that as the water is heated by electric heaters 43, 44 surrounding the mold body 12 and encased within generally dove tail grooves 45, 46 respectively, the tire T will be cured preferably by the introduction of steam from the coil 42 into the chamber 13 through a port 47 provided with a suitable valve (not shown). Thus steam, condensate, and/or water will be admitted into the chamber 13 at a sufficient temperature (generally 300 F) and pressure (generally 65 P.s.i.) to achieve the intended curing operation.

The mold body 11 is also provided with a valve 50 which is placed in communication with the chamber 13 through a port 51 in order that any air which may be entrapped in the chamber 13 when the tire T is first placed therein may escape to atmosphere. The valve 50 may also, of course, be used to purge the system of any air that may become entrapped in it.

A conduit 52 provided with an appropriate valve (not shown) is in food communication with the chamber 13 and is used to permit the escape of condensate from the interior of the chamber 13.

It is once again emphasized that one important aspect of this invention is the provision on the radially inner most sidewalls (unnumbered) of the envelope 14 of radial or diagonal grooves to permit the evacuation of air or the like from all areas between the exterior surface of the tire T and the envelope 14 surrounding the same.

While preferred forms and arrangements of parts have been shown in illustrating the invention, it is to be clearly understood that various changes in detail and arrangement of parts may be made without departing from the spirit and scope of this disclosure.

I claim:

1. A mold particularly adapted for applying precured tread rubber to tires of different widths comprising a pair of generally annular mold bodies which collectively define a chamber adapted to receive a tire, said annular mold bodies being capable of relative axial movement whereby an axial dimension of said chamber may be selectively adjusted to accommodate tires of different widths, means for locking said annular mold bodies to each other at any one of a plurality of positions of relative axial adjustment between said mold bodies, axially movable axial adjustment means for selectively adjusting the axial dimension of said chamber, said axial adjustment means being carried by one of said annular mold bodies, and said axial adjustment means when selectively adjusted to accommodate a particular tire width has a terminal end face resting upon another of said annular mold bodies.

2. The mold as defined in claim 1 including generally annular surface means of said annular mold mold bodies in generally contacting concentric relative telescopic relationship whereby guidance is provided to assure circumferential consistency of said annular mold bodies at all axially adjusted positions thereof.

3. The mold as defined in claim 1 including means for heating at least one of said annular mold bodies.

4. The mold as defined in claim 1 including a generally annular envelope within said chamber adapted to at least partially encase a tire therein.

5. The mold as defined in claim 1 including a generally annular envelope within said chamber adapted to at least partially encase a tire therein, and means for introducing a heated medium into said chamber between said annular mold bodies and said envelope.

6. The mold as defined in claim 1 including a generally annular envelope within said chamber adapted to at least partially encase a tire therein, and means for venting to atmosphere an area between a sidewall of said tire and said envelope.

7. The mold as defined in claim 1 wherein said axial adjustment means are spaced circumferentially about said one annular mold body.

8. The mold as defined in claim 1 wherein said axial adjustment means are spaced circumferentially about said one annular mold body, and each axial adjustment means is an axially shiftable rod.

9. The mold as defined in claim 2 wherein said axial adjustment means are spaced circumferentially about said one annular mold body, and each axial adjustment means is an axially shiftable rod.

10. The mold as defined in claim 4 wherein said axial adjustment means are spaced circumferentially about said one annular mold body, and each axial adjustment means is an axially shiftable rod.

11. The mold as defined in claim 4 wherein said axial adjustment means are spaced circumferentially about said one annular mold body.

12. The mold as defined in claim 6 wherein said axial adjustment means are spaced circumferentially about said one annular mold body, and each axial adjustment means is an axially shiftable rod.

13. The mold as defined in claim 1 wherein said axial adjustment means effect stepwise adjustment between said annular mold bodies.

14. The mold as defined in claim 13 wherein said locking means effects stepwise clamping of said annular mold bodies to each other in correspondence with the stepwise adjustment of said annular mold bodies by said adjustment means.

15. The mold as defined in claim 14 wherein said axial adjustment means are spaced circumferentially about said one annular mold body and each axial adjustment means is an axially shiftable rod.

16. The mold as defined in claim 15 wherein each rod carries a detent, each rod is received in a tubular sleeve, and each sleeve includes a longitudinal slot and a plurality of axially spaced circumferentially disposed slots adapted to receive said detent for effecting said stepwise adjustment between said annular mold bodies.

* * * * *